United States Patent [19]

Hanson et al.

[11] 4,372,359

[45] Feb. 8, 1983

[54] METHOD FOR DEPLOYMENT OF A TOWED ARRAY FROM A SWATH SHIP

[75] Inventors: Paul A. Hanson, La Mesa; John D. Hightower, San Diego, both of Calif.; Alvah T. Strickland, Kaneohe, Hi.

[73] Assignee: The United States of America as represented by the Secretary of the Navy, Washington, D.C.

[21] Appl. No.: 258,988

[22] Filed: Apr. 30, 1981

[51] Int. Cl.³ .............................................. B63B 21/66
[52] U.S. Cl. .................................... 114/244; 114/254
[58] Field of Search ............... 114/242, 244, 245, 253, 114/254; 367/106, 130

[56] References Cited

U.S. PATENT DOCUMENTS 3,480,907  11/1969  King ................................ 114/244 X
3,978,813   9/1976  Pickens et al. .................. 114/244 X

*Primary Examiner*—Sherman D. Basinger
*Attorney, Agent, or Firm*—Robert F. Beers; Ervin F. Johnston; Terrance A. Meador

[57] ABSTRACT

A method for deploying towed instrumentation arrays from vessels having multiple submerged hulls is disclosed. The method significantly reduces the possibility of the array abrading or fouling upon any submerged structure or part of the vessel.

11 Claims, 10 Drawing Figures

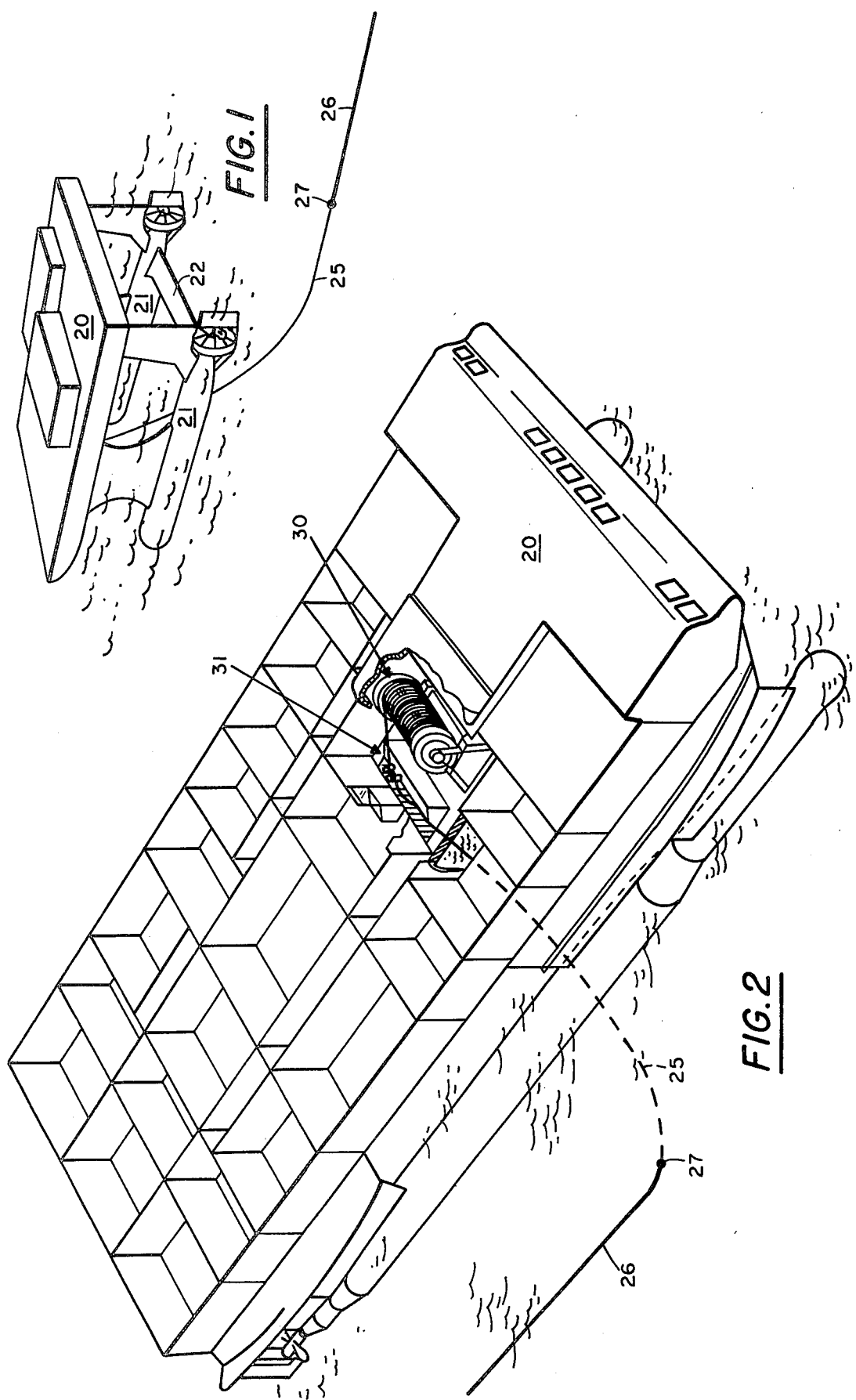

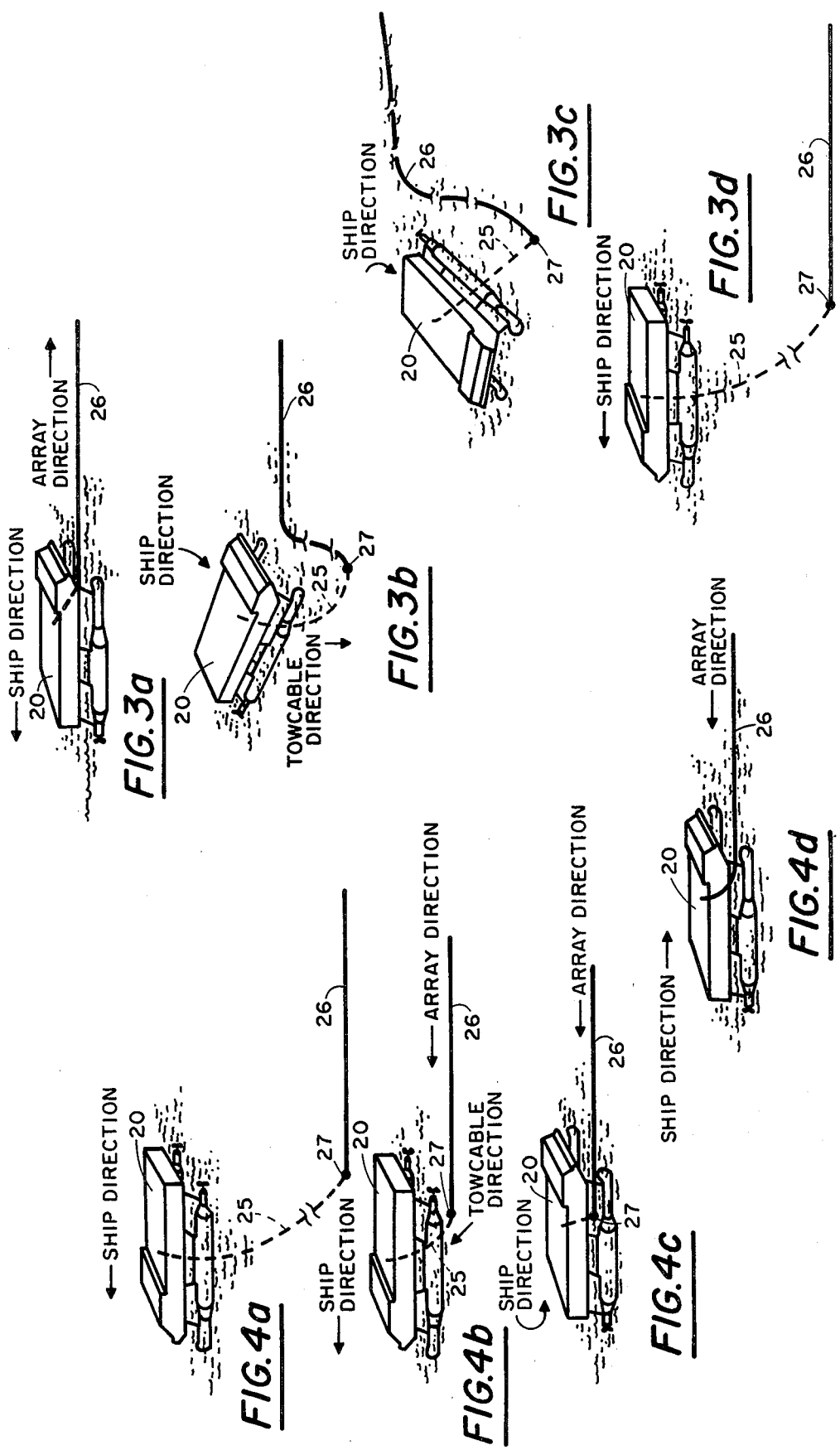

METHOD FOR DEPLOYMENT OF A TOWED ARRAY FROM A SWATH SHIP

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Advances in naval architecture have led to the development of a semisubmerged ship having a plurality of hulls completely disposed beneath the surface of the water in which the ship is deployed. Such vessels enjoy a dynamic pitch stability and a maneuverability superior to monohull vessels of conventional design. See U.S. Pat. Nos. 3,623,444 and 3,730,123 issued to Thomas G. Lang. One embodiment of this novel concept is illustrated in FIG. 1 and is designated as a Small Waterplane Area Twin-Hull (SWATH) ship.

Because of its superior stability and maneuverability at all speeds, the SWATH ship offers an excellent platform from which various physical measurements of the ocean environment can be carried out. The usual means for carrying out real-time marine measurements is to trail a sensor package behind the moving marine vessel by means of a negatively buoyant towline attached between the vessel and the package. In conventional such an apparatus is normally deployed by paying out the package and line over the stern of the ship and towing them behind as the vessel moves through the water.

In the case of the SWATH ship, the stern deployment technique can interfere with efficient vessel operation and pose a danger of equipment damage. The combined weight of the towed array, storage reel, and related mechanical equipment is such that if the equipment were to be located at the stern of the SWATH, rather than amidships, the vessel would become imbalanced to the detriment of its stability and maneuverability. Also, because of the horizontal stabilization member connecting the submerged hulls at the stern of the ship, and because of the propellers which protrude from the hulls, a sensor package cannot be deployed from a position amidships while the ship is moving in a forward direction without running the risk of damage to the package, towline, or ship. Hence, a novel method of instrument deployment from a SWATH ship is required which will ensure the correct launching of the package without danger of damage.

SUMMARY OF THE INVENTION

The present invention is directed to providing a safe, reliable method of deploying an instrument package from a vessel having multiple submerged hulls, which hulls are joined by a horizontal stabilization member near the stern of the ship. The method of deployment includes the steps of maneuvering the vessel in a reverse direction as first the instrument package, and then a negatively buoyant weighted towcable are payed out from the underside of the vessel, the package thereby being launched out in front of the vessel. As the cable is payed out, its weight causes it to sink down beneath the vessel and to form a loop between the instrument package and the vessel. Then the vessel is maneuvered in a 180° turn over the loop formed by the weighted towcable. Thereafter, the vessel may operate in a mode standard to vessels deploying instrument packages from their sterns. To recover the array, the towcable is winched aboard the vessel while the vessel is moving forward until the instrument package is at a depth at which, if more of the towcable is reeled in, the package will fail to clear the underside of the ship. The vessel is then rotated at a point above the package and is moved in a reverse direction as the remainder of the cable and the instrument package are recovered through the underside of the vessel.

In view of the foregoing, it is the prime object of the invention to provide a safe, reliable means of deploying a towed instrument package from a vessel having multiple submerged hulls.

Another object is to provide a method for recovering an instrument package which is towed by a vessel of the type described.

These and other objects of the invention will become apparent with reference to the following specification taken together with the drawings.

BRIEF DESCRIPTION OF THE DRAWINGS

FIG. 1 is an isometric view of a SWATH ship towing an instrument package.

FIG. 2 is an isometric cutaway view of the SWATH showing how the towed package is deployed FIGS. 3a, 3b, 3c, and 3d show the method for deploying the instrument package.

FIGS. 4a, 4b, 4c, and 4d show the method of recovering the instrument package.

DESCRIPTION OF THE PREFERRED EMBODIMENT

With reference now to FIG. 1, there is shown a SWATH ship 20 having two submerged hulls 21. The hulls may be connected at the stern of the ship by horizontal stabilization member 22. In the figure, the SWATH ship 20 is shown towing an instrument package 26 which is connected to the ship by a heavy towline 25. The towline and instrument package are joined at point 27. The instrument package may comprise, for example, a standard metering array, which consists of a neutrally bouyant, flexible, oil-filled hose containing electronic sensors for measuring the acoustic and thermal properties of the ocean environment. The towcable may consist of a heavy steel-armored cable which, as shown in FIG. 2, is attached to a winch reel 30 and passes over an overboarding fixture 31 and through an opening 32 in the ship, then into the ocean.

The design goals of stability and maneuverability require that the deployment mechanism comprising a winch reel, overboarding fixture, and towcable be located near the centroid of the ship. However, this location prevents the array and towline from being deployed simply by playing them out into the ocean from the stern of the ship while the ship moves forward. The presence of the propellers and the placement of the submerged stabilization member athwart the centerline of the ship pose a threat of damage to either the ship or the towed array if deployment is carried out by simply dropping the array from the underside opening located amidships while the ship is moving forward. A safe, reliable method of deployment which neutralizes the danger of damage is illustrated in FIGS. 3a, 3b, and 3c.

Safe deployment of the towed array can be accomplished by backing the ship up in the direction shown in FIG. 3a while playing out the neutrally bouyant array from the underside aperture located amiships. As the ship backs up, the array streams out in front of the ship until it is completely payed out and the towcable begins to emerge. The towcable is payed out at such a rate that it sinks and pulls the end of the array down with it, forming a large loop downward in the water beneath the ship (FIG. 3b).

As shown in FIG. 3c, when the loop is formed, the ship can turn in a pivot or a tight arc, drive over the loop, and avoid the portion of the array remaining on the surface. The ship can then proceed ahead while continuing to pay out the towcable until a desired amount of length is launched and the whole array is submerged to the desired depth. The towed array can then be operated in its normal manner with the ship maneuvering as required to follow a forward course as shown in FIG. 3d. It is obvious that the ship is limited to a maximum speed beyond which the towcable will be moved upward by the force of the water to contact the underside of the ship. This speed will of course be a function of the mass and size of the towcable per unit length and of the amount of towcable in the water.

FIGS. 4a, 4b, 4c, and 4d illustrate a method of recovering the towcable and array. At the end of operations (FIG. 4a), and while the ship is still moving in a forward direction, the towcable is winched aboard (FIG. 4b) until the array is at an optimum depth for the ship to turn above it in a pivot or a tight arc without contacting it (FIG. 4c). If desired, the ship may begin the turn when recovery of the towcable is initiated. The ship turns and reverses engines to maintain motion in the direction shown in FIGS. 4a, 4b, and 4c. Once the ship is turned so that the array extends in front of it, the direction of motion is maintained in order to straighten the array and bring it to the surface (FIG. 4c). As illustrated in FIG. 4d, after the array has been straightened, the ship reverses direction and drives forward over the array as the array is being winched aboard until the remainder of the array is fully recovered. Speed is maintained at a rate to prevent the ship driving over the array while it is being reeled in and to reduce the tension with which the array is wound onto the winch.

The method combining the launch and recovery sequences described above allows a towed array to be deployed from a SWATH ship with the minimum possibility of the array contacting the propellors or any submerged portion of the ship, thus greatly reducing the danger of damage to the array or to the ship. The novel features of this method include the towed array operations from a SWATH ship and the launch and recovery of the array from a point amidships.

Of course, it is obvious that there are variables and alternatives in the placement of the winch and overboarding fixture aboard the ship, in the speed of the ship during all phases of launch, recovery, and tow operations, and in various maneuvers that might be required to prevent damage to the array from operations from the towing ship or other ships in the vicinity. The preferred method allows flexibility in devising and employing these variables and alternatives. For these reasons it is obvious that the invention can be practiced other than as disclosed herein.

What is claimed is:

1. A method for deploying and recovering an apparatus to be towed in the water by a towcable attached between the apparatus and a vessel having a plurality of submerged hulls, comprising the steps of:

maneuvering the vessel in a reverse direction while paying out the apparatus from the underside of the vessel, the towcable and apparatus then streaming out in front of the vessel;

paying out the towcable at such a rate as to cause a section of the towcable near the vessel to sink beneath the vessel until that section forms a loop downward in the water; and turning the vessel in a substantially pivotal direction to rotate above the loop;

whereby, when the vessel maneuvers into a straight forward direction from the turn it will pass over and clear the loop thereby causing the apparatus to be towed behind the vessel.

2. A method as in claim 1 wherein the apparatus is recovered by the steps of:

maneuvering the vessel in a forward direction while pulling in the towcable to the underside of the vessel;

after a predetermined amount of towcable has been pulled in, turning the vessel in a substantially pivotal direction to position the remainder of the towcable and the apparatus forward of the vessel;

maneuvering the vessel in a backward direction while pulling the towline in until the array is brought to the surface and straightened forward of the vessel; and pulling in the apparatus.

3. A method as in claim 2 wherein the points on the underside of the vessel wherefrom the towcable and apparatus are payed out and pulled in are the same point and the point is located amidships.

4. A method as in claim 3 wherein the apparatus is a neutrally buoyant elongated instrumentation array.

5. A method as in claim 4 wherein the array is a flexible, oil-filled hose containing sensors.

6. A method as in claim 5 wherein the towcable is a negatively buoyant steel armored towline.

7. A method as in claim 3 wherein the towcable is a negatively buoyant steel armored towline.

8. A method of deploying an elongated, neutrally buoyant apparatus to be towed by a negatively buoyant towcable behind a vessel having a plurality of submerged hulls, comprising the steps of:

maneuvering the vessel in a reverse direction while paying out the apparatus and towcable from the underside of the vessel at a point amidships, the apparatus and towcable then streaming out in front of the vessel with a portion of the apparatus on the surface of the water and the towcable underwater;

deploying enough of the towcable to form a loop downward in the water beneath the vessel; and maneuvering the vessel in a substantially pivotal direction to rotate above and to pass over the loop.

9. A method of recovering an elongated, neutrally buoyant apparatus being towed by a negatively buoyant towcable behind a vessel having a plurality of submerged hulls, comprising the steps of:

maneuvering the vessel in a forward direction while pulling in the towcable and attached apparatus;

after a predetermined amount of towcable has been pulled in, maneuvering the vessel in a substantially pivotal direction to rotate it above the towcable whereby the towcable and the apparatus are positioned forward of the vessel;

maneuvering the vessel backward while pulling the towline in to the underside of the vessel at a point amidships the backward maneuver being maintained until the array is brought to the surface and staightened forward of the vessel; and pulling in the apparatus.

10. The method of claim 9 further including a method of deploying an elongated, neutrally buoyant apparatus to be towed by a negatively buoyant towcable behind a vessel having a plurality of submerged hulls, comprising the steps of:

maneuvering the vessel in a reverse direction while paying out the apparatus and towcable from the underside of the vessel at a point amidships, the apparatus and towcable then streaming out in front of the vessel with a portion of the apparatus on the surface of the water and the towcable underwater;

deploying enough of the towcable to form a loop downward in the water beneath the vessel; and maneuvering the vessel in a substantially pivotal direction to rotate above and to pass over the loop.

11. The method of claim 10 wherein the towcable and array are payed out from and pulled into the same point.

* * * * *